(12) United States Patent
Yoon et al.

(10) Patent No.: US 12,091,806 B2
(45) Date of Patent: Sep. 17, 2024

(54) METHOD OF USING IMAGE RECOGNITION PROCESSES FOR IMPROVED OPERATION OF A LAUNDRY APPLIANCE

(71) Applicant: Haier US Appliance Solutions, Inc., Wilmington, DE (US)

(72) Inventors: Je Kwon Yoon, Seongnam Gyeonggi (KR); Hoyoung Lee, Seoul (KR); Khalid Mashal, Louisville, KY (US); JaeHyo Lee, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 650 days.

(21) Appl. No.: 17/115,925

(22) Filed: Dec. 9, 2020

(65) Prior Publication Data

US 2022/0178067 A1    Jun. 9, 2022

(51) Int. Cl.
| | | |
|---|---|---|
| *D06F 39/08* | (2006.01) | |
| *D06F 23/04* | (2006.01) | |
| *D06F 33/34* | (2020.01) | |
| *D06F 34/14* | (2020.01) | |
| *D06F 103/14* | (2020.01) | |
| *D06F 103/18* | (2020.01) | |
| *D06F 105/02* | (2020.01) | |
| *D06F 105/58* | (2020.01) | |
| *G06V 20/00* | (2022.01) | |

(52) U.S. Cl.
CPC ............ *D06F 39/087* (2013.01); *D06F 23/04* (2013.01); *D06F 33/34* (2020.02); *D06F 34/14* (2020.02); *G06V 20/00* (2022.01); *D06F 2103/14* (2020.02); *D06F 2103/18* (2020.02); *D06F 2105/02* (2020.02); *D06F 2105/58* (2020.02)

(58) Field of Classification Search
None
See application file for complete search history.

(56) References Cited

U.S. PATENT DOCUMENTS

| | | | |
|---|---|---|---|
| 11,359,327 B2 * | 6/2022 | Ha ........................... | G06N 5/04 |
| 2019/0382941 A1 | 12/2019 | Hwang et al. | |
| 2020/0071871 A1 | 3/2020 | Kim et al. | |
| 2020/0157725 A1 * | 5/2020 | Lv .......................... | D06F 39/083 |

FOREIGN PATENT DOCUMENTS

| | | | | |
|---|---|---|---|---|
| CN | 109385811 A | * | 2/2019 | ............. D06F 33/00 |
| JP | 2003/190688 A | | 7/2003 | |
| KR | 2019/0026517 A | | 3/2019 | |
| WO | WO2019/109785 A1 | | 6/2019 | |

* cited by examiner

*Primary Examiner* — Rita P Adhlakha
(74) *Attorney, Agent, or Firm* — Dority & Manning, P.A.

(57) ABSTRACT

A washing machine appliance includes a wash basket that is rotatably mounted within a wash tub and that defines a wash chamber for receiving a load of clothes. A water supply adds water to the wash tub during a fill cycle and a camera assembly is used to monitor the water level. Specifically, the camera assembly obtains one or more images of the wash chamber during and/or after a fill cycle and a controller analyzes the images using a machine learning image recognition process to determine when the water within the wash tub has reached a predetermined water level, e.g., optimized based on load size or other load parameters. If the water in the wash tub is below or above the predetermined water level, the controller may implement responsive action, e.g., by adjusting at least one operating parameter of the washing machine appliance.

15 Claims, 6 Drawing Sheets

METHOD OF USING IMAGE RECOGNITION PROCESSES FOR IMPROVED OPERATION OF A LAUNDRY APPLIANCE

FIELD OF THE INVENTION

The present subject matter relates generally to washing machine appliances, or more specifically, to systems and methods for using image recognition processes to improve or optimize operation of washing machine appliances

BACKGROUND OF THE INVENTION

Washing machine appliances generally include a tub for containing water or wash fluid, e.g., water and detergent, bleach, and/or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc. During a spin or drain cycle of a washing machine appliance, a drain pump assembly may operate to discharge water from within sump.

Conventional washing machine appliances perform a fill process by opening a water valve for a predetermined amount of time, e.g., the time being determined based on the desired volume of water and an average valve flow rate. However, certain conditions may cause the actual volume supplied through the water valve to vary, e.g., in the event the water pressure is low due to a restriction in the municipal supply or heavy parallel use of water within the house (e.g., multiple faucets being used). Conventional washing machine appliances may also use pressure sensors to detect water level, but these sensors can malfunction, and pressure readings may vary significantly. As a result, conventional washing machine appliances may experience difficulties in accurately estimating the amount of wash fluid within the wash tub, which may result in degraded cycle performance and potential damage to the load of clothes.

Accordingly, a washing machine appliance with features for improved wash performance would be desirable. More specifically, a system and method for precisely identifying the amount of wash fluid within the wash tub would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a washing machine appliance is provided including a wash tub positioned within a cabinet, a wash basket rotatably mounted within the wash tub and defining a wash chamber configured for receiving of a load of clothes, a water supply positioned within the cabinet and being configured to selectively fill the wash tub with water, a camera assembly mounted within the cabinet in view of the wash chamber, and a controller operably coupled to the camera assembly. The controller is configured to perform a fill process, obtain one or more images of the wash chamber using the camera assembly, analyze the one or more images using a machine learning image recognition process to determine that the water within the wash tub has reached a predetermined water level, and adjust at least one operating parameter of the washing machine appliance based at least in part on determining that the water within the wash tub has reached the predetermined water level.

In another exemplary embodiment, a method of operating a washing machine appliance is provided. The washing machine appliance includes a wash basket rotatably mounted within a wash tub and defining a wash chamber configured for receiving of a load of clothes, a water supply for selectively filling the wash tub with water, and a camera assembly mounted within the cabinet in view of the wash chamber. The method includes performing a fill process, obtaining one or more images of the wash chamber using the camera assembly, analyzing the one or more images using a machine learning image recognition process to determine that the water within the wash tub has reached a predetermined water level, and adjusting at least one operating parameter of the washing machine appliance based at least in part on determining that the water within the wash tub has reached a predetermined water level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
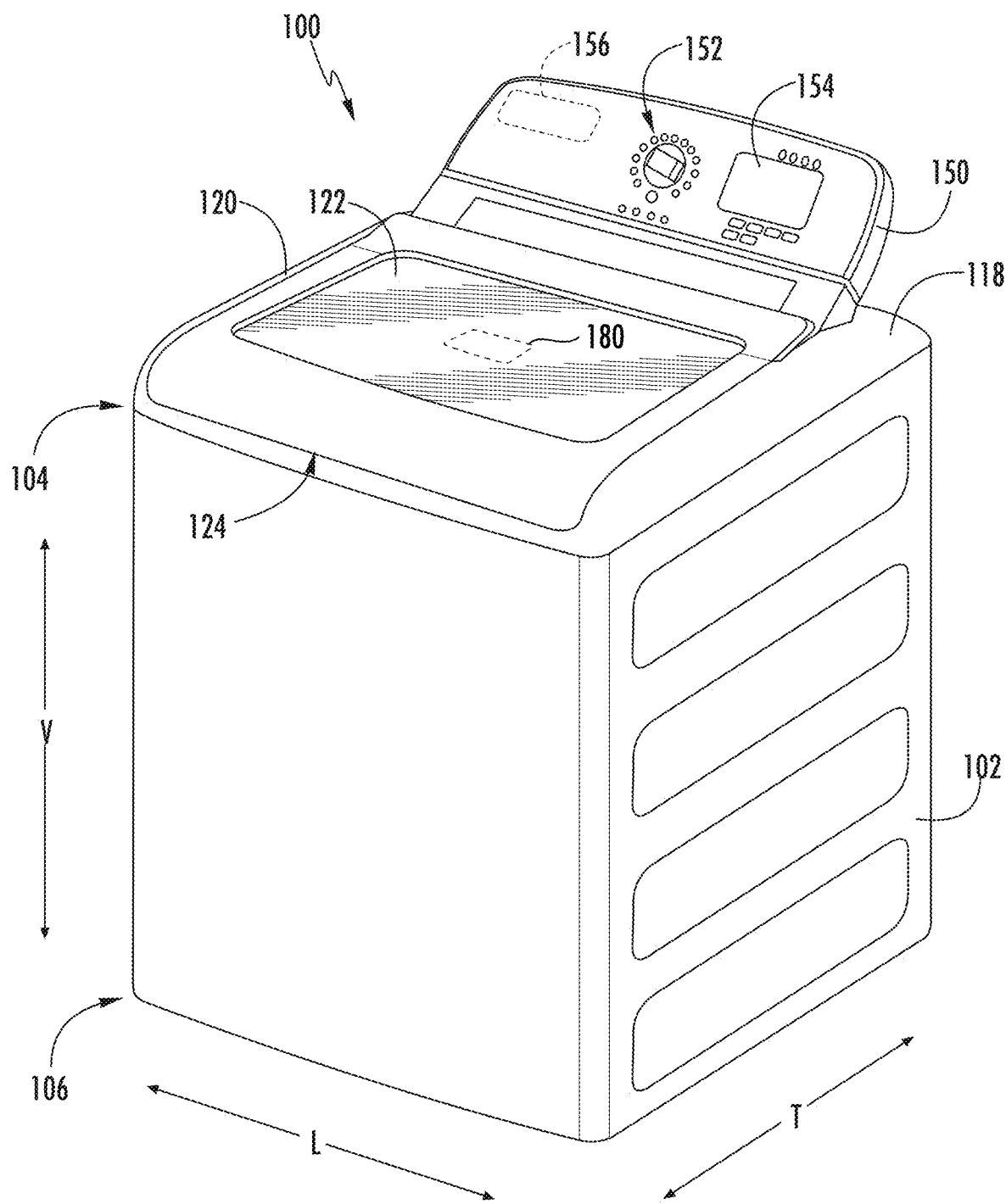
FIG. 1 provides a perspective view of a washing machine appliance according to an exemplary embodiment of the present subject matter with a door of the exemplary washing machine appliance shown in a closed position.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
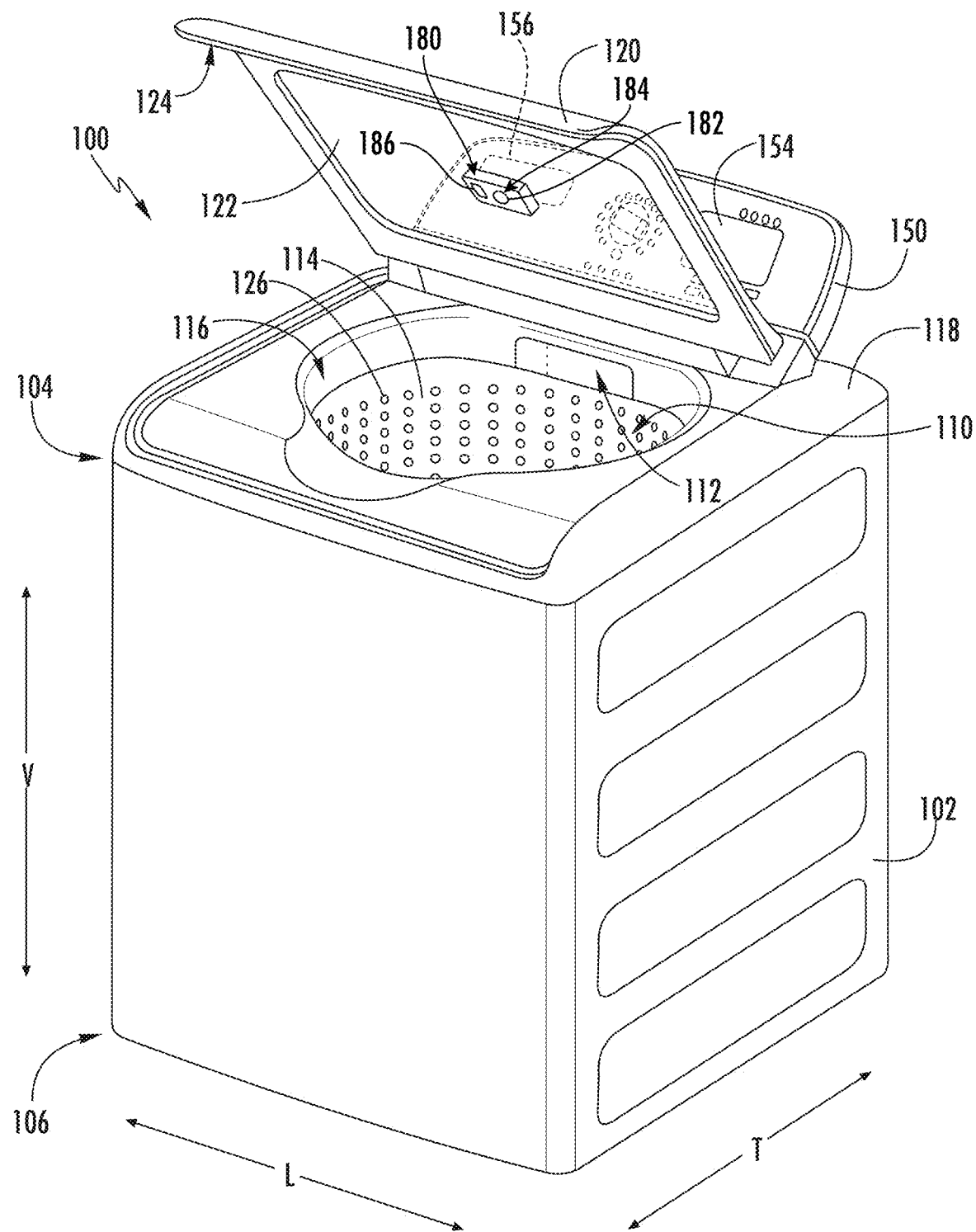
FIG. 2 provides a perspective view of the exemplary washing machine appliance of FIG. 1 with the door of the exemplary washing machine appliance shown in an open position.
Figure 3:
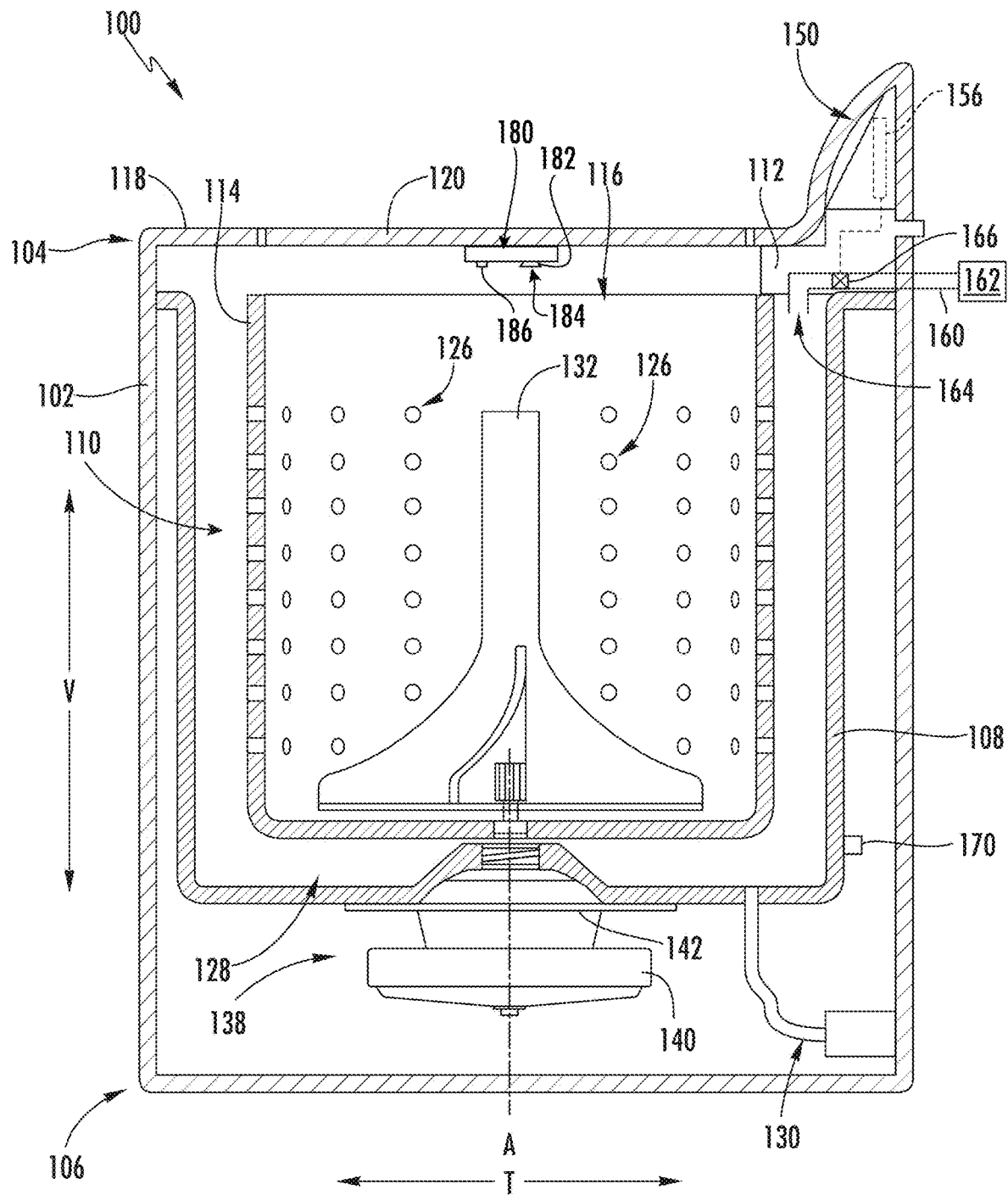
FIG. 3 provides a side cross-sectional view of the exemplary washing machine appliance of FIG. 1.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V, between a first side (left) and a second side (right) along the lateral direction L, and between a front and a rear along the transverse direction T. As best shown in FIG. 3, a wash tub 108 is positioned within cabinet 102, defines a wash chamber 110, and is generally configured for retaining wash fluids during an operating cycle. Washing machine appliance 100 further includes a primary dispenser 112 (FIG. 2) for dispensing wash fluid into wash tub 108. The term "wash fluid" refers to a liquid used for washing and/or rinsing articles during an operating cycle and may include any combination of water, detergent, fabric softener, bleach, and other wash additives or treatments.

In addition, washing machine appliance 100 includes a wash basket 114 that is positioned within wash tub 108 and generally defines an opening 116 for receipt of articles for washing. More specifically, wash basket 114 is rotatably mounted within wash tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100. However, it should be appreciated that aspects of the present subject matter may be used within the context of a horizontal axis or front load washing machine appliance as well.

As illustrated, cabinet 102 of washing machine appliance 100 has a top panel 118. Top panel 118 defines an opening (FIG. 2) that coincides with opening 116 of wash basket 114 to permit a user access to wash basket 114. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 114. Conversely, in the open position, a user can access wash basket 114. A window 122 in door 120 permits viewing of wash basket 114 when door 120 is in the closed position, e.g., during operation of washing machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 114 further defines a plurality of perforations 126 to facilitate fluid communication between an interior of wash basket 114 and wash tub 108. In this regard, wash basket 114 is spaced apart from wash tub 108 to define a space for wash fluid to escape wash chamber 110. During a spin cycle, wash fluid within articles of clothing and within wash chamber 110 is urged through perforations 126 wherein it may collect in a sump 128 defined by wash tub 108. Washing machine appliance 100 further includes a pump assembly 130 (FIG. 3) that is located beneath wash tub 108 and wash basket 114 for gravity assisted flow when draining wash tub 108.

An impeller or agitation element 132 (FIG. 3), such as a vane agitator, impeller, auger, oscillatory basket mechanism, or some combination thereof is disposed in wash basket 114 to impart an oscillatory motion to articles and liquid in wash basket 114. More specifically, agitation element 132 extends into wash basket 114 and assists agitation of articles disposed within wash basket 114 during operation of washing machine appliance 100, e.g., to facilitate improved cleaning. In different embodiments, agitation element 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 132 and wash basket 114 are oriented to rotate about axis of rotation A (which is substantially parallel to vertical direction V).

As best illustrated in FIG. 3, washing machine appliance 100 includes a drive assembly 138 in mechanical communication with wash basket 114 to selectively rotate wash basket 114 (e.g., during an agitation or a rinse cycle of washing machine appliance 100). In addition, drive assembly 138 may also be in mechanical communication with agitation element 132. In this manner, drive assembly 138 may be configured for selectively rotating or oscillating wash basket 114 and/or agitation element 132 during various operating cycles of washing machine appliance 100.

More specifically, drive assembly 138 may generally include one or more of a drive motor 140 and a transmission assembly 142, e.g., such as a clutch assembly, for engaging and disengaging wash basket 114 and/or agitation element 132. According to the illustrated embodiment, drive motor 140 is a brushless DC electric motor, e.g., a pancake motor. However, according to alternative embodiments, drive motor 140 may be any other suitable type or configuration of motor. For example, drive motor 140 may be an AC motor, an induction motor, a permanent magnet synchronous motor, or any other suitable type of motor. In addition, drive assembly 138 may include any other suitable number, types, and configurations of support bearings or drive mechanisms.

Referring still to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation.

Operation of washing machine appliance 100 is controlled by a controller or processing device 156 that is operatively coupled to control panel 150 for user manipulation to select washing machine cycles and features. In response to user manipulation of control panel 150, controller 156 operates the various components of washing machine appliance 100 to execute selected machine cycles and features. According to an exemplary embodiment, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

During operation of washing machine appliance 100, laundry items are loaded into wash basket 114 through opening 116, and washing operation is initiated through operator manipulation of input selectors 152. Wash basket 114 is filled with water and detergent and/or other fluid additives via primary dispenser 112. One or more valves can be controlled by washing machine appliance 100 to provide for filling wash tub 108 and wash basket 114 to the appropriate level for the amount of articles being washed and/or rinsed. By way of example for a wash mode, once wash basket 114 is properly filled with fluid, the contents of wash basket 114 can be agitated (e.g., with agitation element 132 as discussed previously) for washing of laundry items in wash basket 114.

More specifically, referring again to FIG. 3, a water fill process will be described according to an exemplary embodiment. As illustrated, washing machine appliance 100 includes a water supply conduit 160 that provides fluid communication between a water supply source 162 (such as a municipal water supply) and a discharge nozzle 164 for directing a flow of water into wash chamber 110. In addition, washing machine appliance 100 includes a water fill valve or water control valve 166 which is operably coupled to water supply conduit 160 and communicatively coupled to controller 156. In this manner, controller 156 may regulate the operation of water control valve 166 to regulate the amount of water within wash tub 108.

Although water supply conduit 160, water supply source 162, discharge nozzle 164, and water control valve 166 are all described and illustrated herein in the singular form, it should be appreciated that these terms may be used herein generally to describe a supply plumbing for providing hot and/or cold water into wash chamber 110. In this regard, water supply conduit 160 may include separate conduits for receiving hot and cold water, respectively. Similarly, water supply source 162 may include both hot- and cold-water supplies regulated by dedicated valves. In addition, washing machine appliance 100 may include one or more pressure sensors 170 for detecting the amount of water and or clothes within wash tub 108. For example, pressure sensor 170 may be operably coupled to a side of tub 108 for detecting the weight of wash tub 108, which controller 156 may use to determine a volume of water in wash chamber 110 and a subwasher load weight.

After wash tub 108 is filled and the agitation phase of the wash cycle is completed, wash basket 114 can be drained, e.g., by drain pump assembly 130. Laundry articles can then be rinsed by again adding fluid to wash basket 114 depending on the specifics of the cleaning cycle selected by a user. The impeller or agitation element 132 may again provide agitation within wash basket 114. One or more spin cycles may also be used as part of the cleaning process. In particular, a spin cycle may be applied after the wash cycle and/or after the rinse cycle in order to wring wash fluid from the articles being washed. During a spin cycle, wash basket 114 is rotated at relatively high speeds to help wring fluid from the laundry articles through perforations 126. After articles disposed in wash basket 114 are cleaned and/or washed, the user can remove the articles from wash basket 114, e.g., by reaching into wash basket 114 through opening 116.

Referring now specifically to FIGS. 2 and 3, washing machine appliance 100 may further include a camera assembly 180 that is generally positioned and configured for obtaining images of a load of clothes within wash chamber 110 of washing machine appliance 100. Specifically, according to the illustrated embodiment, camera assembly 180 may include a camera 182 mounted to an underside of door 120 of washing machine appliance 100. In this manner, when door 120 is in the closed position, camera 182 may be positioned over wash chamber 110 and may be oriented for obtaining images within wash chamber 110. Specifically, camera 182 is mounted such that is faces toward a bottom side of wash tub 108. In this manner, camera 182 can take unobstructed images or video of an inside of wash chamber 110. For example, exemplary images obtained by such a camera assembly 180 are provided in FIGS. 5 and 6 according to exemplary embodiments.

It should be appreciated that camera assembly 180 may include any suitable number, type, size, and configuration of camera(s) 182 for obtaining images of wash chamber 110. In general, cameras 182 may include a lens 184 that is constructed from a clear hydrophobic material or which may otherwise be positioned behind a hydrophobic clear lens. So positioned, camera assembly 180 may obtain one or more images or videos of clothes within wash chamber 110, as described in more detail below. It should be appreciated that other locations for mounting camera assembly 180 are possible, such as below or adjacent a discharge nozzle 164 of washing machine appliance 100.

Referring still to FIGS. 2 through 3, washing machine appliance 100 may further include a tub light 186 that is positioned within cabinet 102 or wash chamber 110 for selectively illuminating wash chamber 110 and the load of clothes positioned therein. Specifically, as shown in FIG. 2, tub light 186 may be integrated into camera assembly 180 and may be positioned immediately adjacent camera 182. According to still other embodiments, tub light 186 may be positioned at any other suitable location within cabinet 102. It should be appreciated that according to alternative embodiments, washing machine appliance 100 may include any other camera or system of imaging devices for obtaining images of the load of clothes. In addition, these cameras may be positioned at any suitable location within cabinet 102, may include any suitable lighting features, and may utilize any suitable photography or imaging technology.

Notably, controller 156 of washing machine appliance 100 (or any other suitable dedicated controller) may be communicatively coupled to camera assembly 180, tub light 186, and other components of washing machine appliance 100. As explained in more detail below, controller 156 may be programmed or configured for analyzing the images obtained by camera assembly 180, e.g., in order to determine the level of water or wash fluid within wash chamber 110 or other cycle information, and may use this information to make informed decisions regarding the operation of washing machine appliance 100.

While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well, e.g., horizontal axis washing machine appliances. In addition, aspects of the present subject matter may be utilized in a combination washer/dryer appliance.

Now that the construction of washing machine appliance 100 and the configuration of controller 156 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as horizontal axis washing machine appliances. In exemplary embodiments, the various method steps as disclosed herein may be performed by controller 156 or a separate, dedicated controller.

Figure 4:
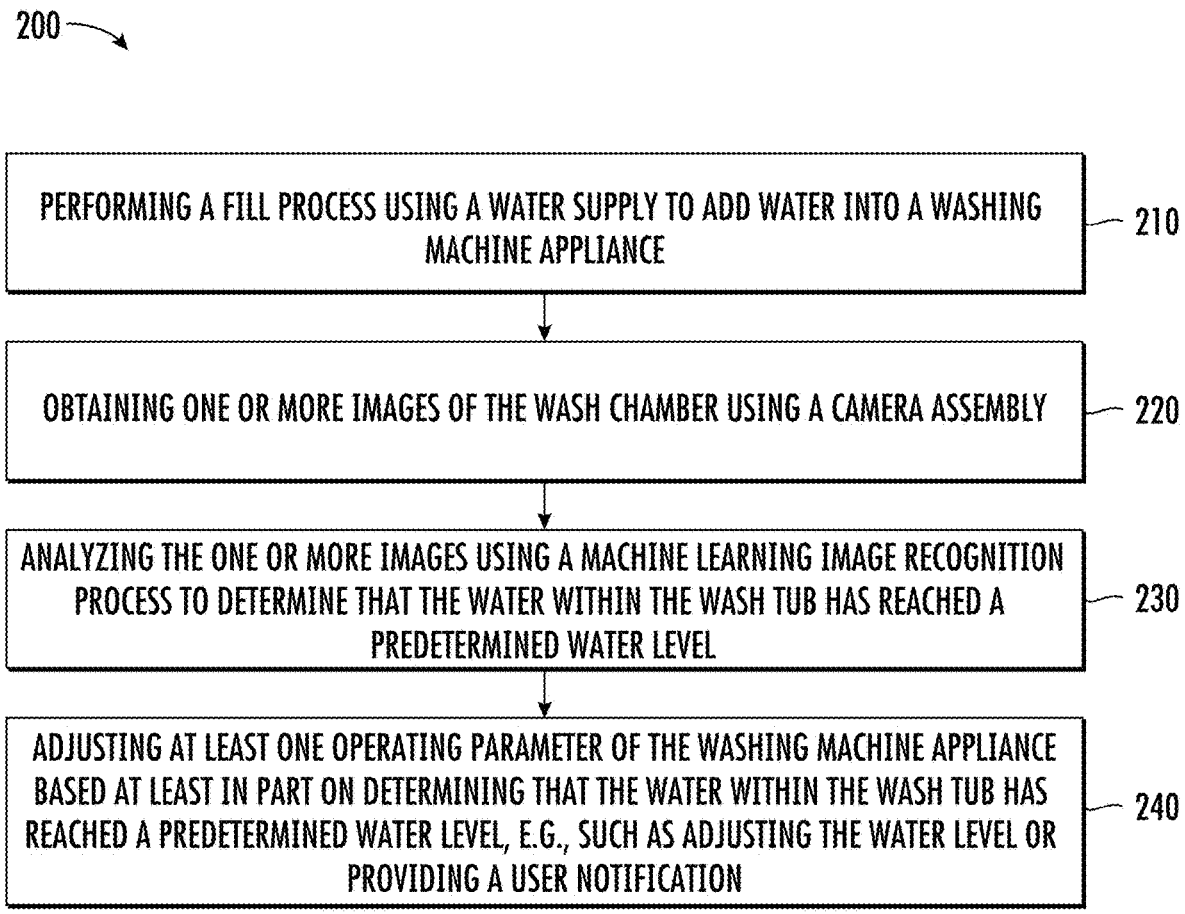
FIG. 4 illustrates a method for operating a washing machine appliance in accordance with one embodiment of the present disclosure.

Referring now to FIG. 4, method 200 includes, at step 210, performing a fill process using a water supply to add water into a washing machine appliance. In this regard, for example water supply source 162 may provide a flow of water through water supply conduit 160 and water control valve 166 may be regulated by controller 156 to discharge a certain amount of water or wash fluid through discharge nozzle 164. According to exemplary embodiments, this fill process may be performed at any time during the operation of washing machine appliance 100, such as just prior to a wash and/or agitation cycle or just prior to a rinse cycle.

After a fill process is complete, or during the fill process, step 220 includes obtaining one or more images of the wash chamber using a camera assembly. In this regard, continuing the example from above, camera assembly 180 may take one or more images of wash chamber 110, including any clothes and water located therein. According to exemplary embodiments, step 230 may include taking one or more still images, one or more video clips, or any other suitable type and number of images suitable for water level detection analysis. It should be appreciated that the images obtained by camera assembly 180 may vary in number, frequency, angle, resolution, detail, etc. in order to improve the clarity of the load of clothes and water within wash chamber 110. In addition, according to exemplary embodiments, controller 156 may be configured for illuminating the tub using tub light 186 just prior to obtaining images. According to still other embodiments, tub light 186 may remain off if camera assembly 180 can obtain suitable images without extra light. For example, if the ambient lighting in a room is sufficient to illuminate wash chamber 110 such that camera assembly may obtain a suitable image facilitating the analysis described herein, tub light 186 may remain off altogether.

Step 230 includes analyzing the one or more images using a machine learning image recognition process to determine that the water within the wash tub has reached a predetermined water level. As used herein, the term "predetermined water level" and the like are generally intended to the amount of water or wash fluid necessary for an optimal, desirable, or improved operating cycle of washing machine appliance 100. For example, too little water can result in damage to articles of clothing and created problems during the rinse cycle, e.g., too high of a detergent concentration. By contrast, too much water may end up agitating the clothes less (e.g., resulting in decreased wash performance) and may result in potentially lower detergent concentration (i.e., detergent is too diluted, but the rinse performance may be better). As used herein, the predetermined water level may be the optimal or improved water level that will provide the best wash/rinse result.

It should be appreciated that the predetermined water level may vary depending on the operating cycle, the stage of a cycle, in a time-based manner, or based on any other suitable parameters or conditions. For example, the predetermined water level may be set by a user, determined by a controller, or input in any other suitable manner. In addition, according to exemplary embodiments, the controller may perform one or more load sensing procedures to determine the predetermined water level, such as a dry load sensing procedure, a wet load sensing procedure, and/or direct weight measurement of the load, e.g., to determine the load size, load weight, and/or load type. The determination may depend at least in part on the load size of the load of clothes in the wash chamber, e.g., small, large, extra-large, or some quantification therebetween. Thus, according to exemplary embodiments, the predetermined water level may not necessarily match with the actual load size, e.g., due to a load that is in between sizes. According to exemplary embodiments, these parameters may be used along with a lookup table to determine the predetermined water level. In addition, the predetermined water level may be determined based at least in part on user inputs, operating cycle settings, etc.

In general, the predetermined water level may be quantified in any suitable manner. For example, the predetermined water level may refer to any suitable representation of the desired amount of water or wash fluid in wash chamber 110, specifically with respect to the load of clothes present within the wash chamber 110. For example, the predetermined water level may be a quantification of the amount of water that is surrounding or present above the load of clothes. Alternatively, this predetermined water level may be represented as an actual water height, e.g., in inches, e.g., measured relative to a top of the clothes, as the amount or a quantification of water reflections 190 (described below) within wash chamber 110, or in any other suitable manner. For example, as water saturates the load of clothes and begins to fill in around or above the load of clothes, the quantity and dispersion of water reflections 190 may increase or vary in an indicative manner of water level. Controller 156 may use those water reflections 190 to determine whether the water within the wash chamber 110 has reached the predetermined water level.

As used herein, the terms image recognition process, water level detection, and similar terms may be used generally to refer to any suitable method of observation, analysis, image decomposition, feature extraction, image classification, etc. of one or more image or videos taken within a wash chamber of a washing machine appliance. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 180 and controller 156 may be programmed to perform such processes and take corrective action.

According to an exemplary embodiment, controller may implement a form of image recognition called region based convolutional neural network ("R-CNN") image recognition. Generally speaking, R-CNN may include taking an input image and extracting region proposals that include a potential object, such as a particular garment or region of a load of clothes. In this regard, a "region proposal" may be regions in an image that could belong to a particular object, such as a particular article of clothing. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 230 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to obtain a quantification of the water level. In addition, a K-means algorithm may be used. Other image recognition processes are possible and within the scope of the present subject matter.

It should be appreciated that any other suitable image recognition process may be used while remaining within the scope of the present subject matter. For example, step 230 of analyzing the one or more images may include using a deep belief network ("DBN") image recognition process. A DBN image recognition process may generally include stacking many individual unsupervised networks that use each network's hidden layer as the input for the next layer. According to still other embodiments, step 230 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

According to exemplary embodiments of the present subject matter, the image analysis performed at step 230 may generally monitor any suitable qualitative or quantitative aspect of the load of clothes or wash chamber 110 which might be indicative of the water level within wash chamber 110. For example, the analysis may include the monitoring of at least one of a color tone, a volume, a weight, a garment type or types of load of clothes. In addition, or alternatively, the analysis may include or be based at least in part on inputs such as a cycle selection, sounds or vibrations generated during a spin cycle, etc.

Figure 5:
FIG. 5 provides an image of a load of clothes in a wash chamber with a low level of water according to an exemplary embodiment of the present subject matter.
Figure 6:
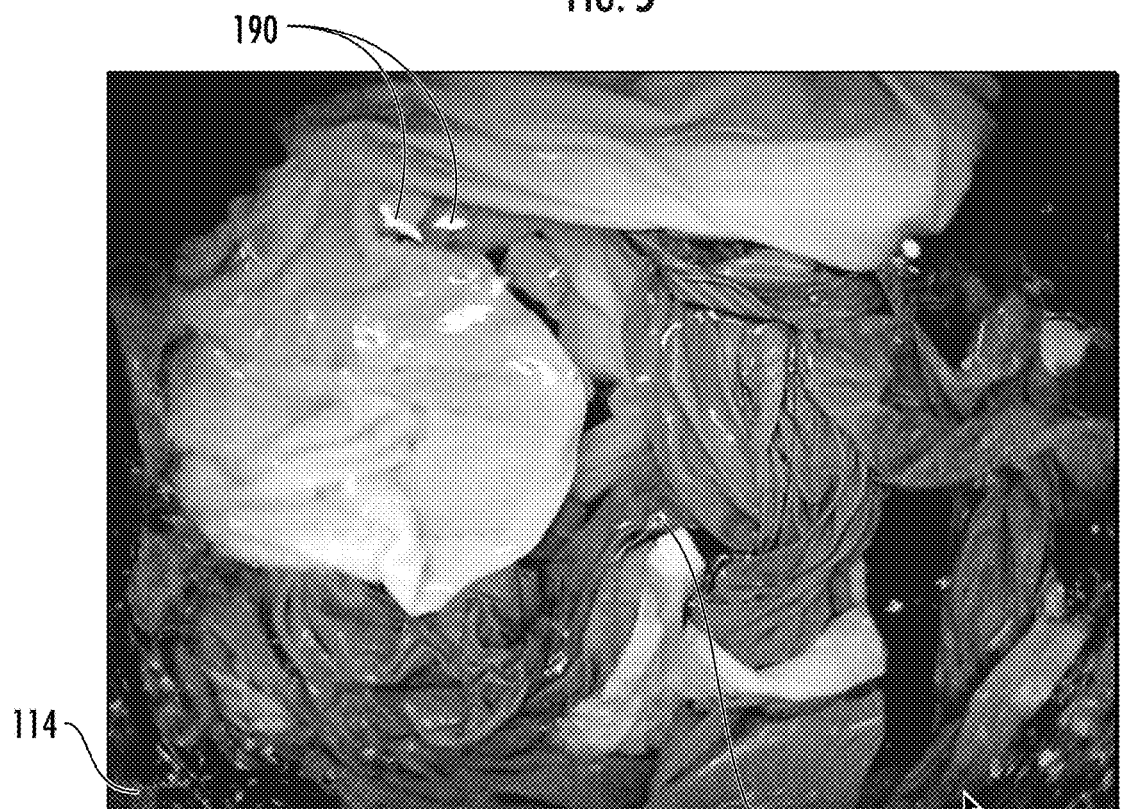
FIG. 6 provides an image of a load of clothes in a wash chamber when the water in the wash chamber has reached a predetermined, optimal water level according to an exemplary embodiment of the present subject matter.

Referring now briefly to FIGS. 5 and 6, exemplary images illustrating water levels within a wash chamber are illustrated according to exemplary embodiments of the present subject matter. Specifically, FIG. 5 illustrates a wash load during or after a fill cycle where insufficient water is present and FIG. 6 illustrates a wash load where the water within wash chamber 110 is equal to the optimal or predetermined wash level. As shown in FIG. 6, various water reflections (identified by reference numeral 190) are identifiable within the wash tub 108. Step 230 of analyzing the one or more images may identify or quantify the amount of water reflections detected in order to estimate the water level. According to exemplary embodiments, step 230 may include identifying other characteristic of the load of clothes and/or wash chamber 110 to determine whether the water within wash tub 108 has reached the predetermined water level.

Step 240 includes adjusting at least one operating parameter of the washing machine appliance based at least in part on determining that the water within the wash tub has reached the predetermined water level. As used herein, an "operating parameter" of washing machine appliance 100 is any cycle setting, operating time, component setting, spin speed, part configuration, water level, water temperature, detergent volume, valve position, or other operating characteristic that may affect the performance of washing machine appliance 100. Thus, references to operating parameter adjustments or "adjusting at least one operating parameter" are intended to refer to control actions intended to improve system performance based on the water level.

For example, controller 156 may be configured for obtaining a predetermined water level. Notably, this predetermined water level may be selected such that the wash or rinse performance is optimized, such that detergent concentrations are ideal, etc. for improving overall performance of washing machine appliance 100. According to exemplary embodiments, controller 156 may continually monitor the water in the wash tub 108 using camera assembly 180 and may end the fill cycle (e.g. by closing water control valve 166) when the predetermined water level is reached. For example, controller 156 may monitor the water within the wash tub 108 and operate water control valve 166 to add water if the water in the wash tub has not reached the predetermined water level and may operate drain pump assembly 130 if the water in the wash tub has exceeded the predetermined water level. According to still other embodiments, controller 156 may modify or alter other cycle parameters based on the water in the wash tub relative to the predetermined water level, e.g., by modifying a detergent level, an agitation profile or intensity, a cycle time or duration, or any other suitable cycle parameter. Other operating parameter adjustments are possible and within the scope of the present subject matter.

In addition, adjusting the at least one operating parameter may include providing a user notification, e.g., via a user interface or control panel 150, in the event that the water in the wash tub 108 remains below the predetermined water level, exceeds the predetermined water level, reaches the predetermined water level, etc. For example, if controller 156 determines that the water within the wash tub 108 remains below the predetermined water level after the completion of a fill cycle, controller may prevent further operating cycles, may add more water, and/or may provide a user notification, e.g., via an indicator on control panel 150 or by communication with a remote device via a wireless communication protocol, such as Wi-Fi or Bluetooth.

Figure 7:
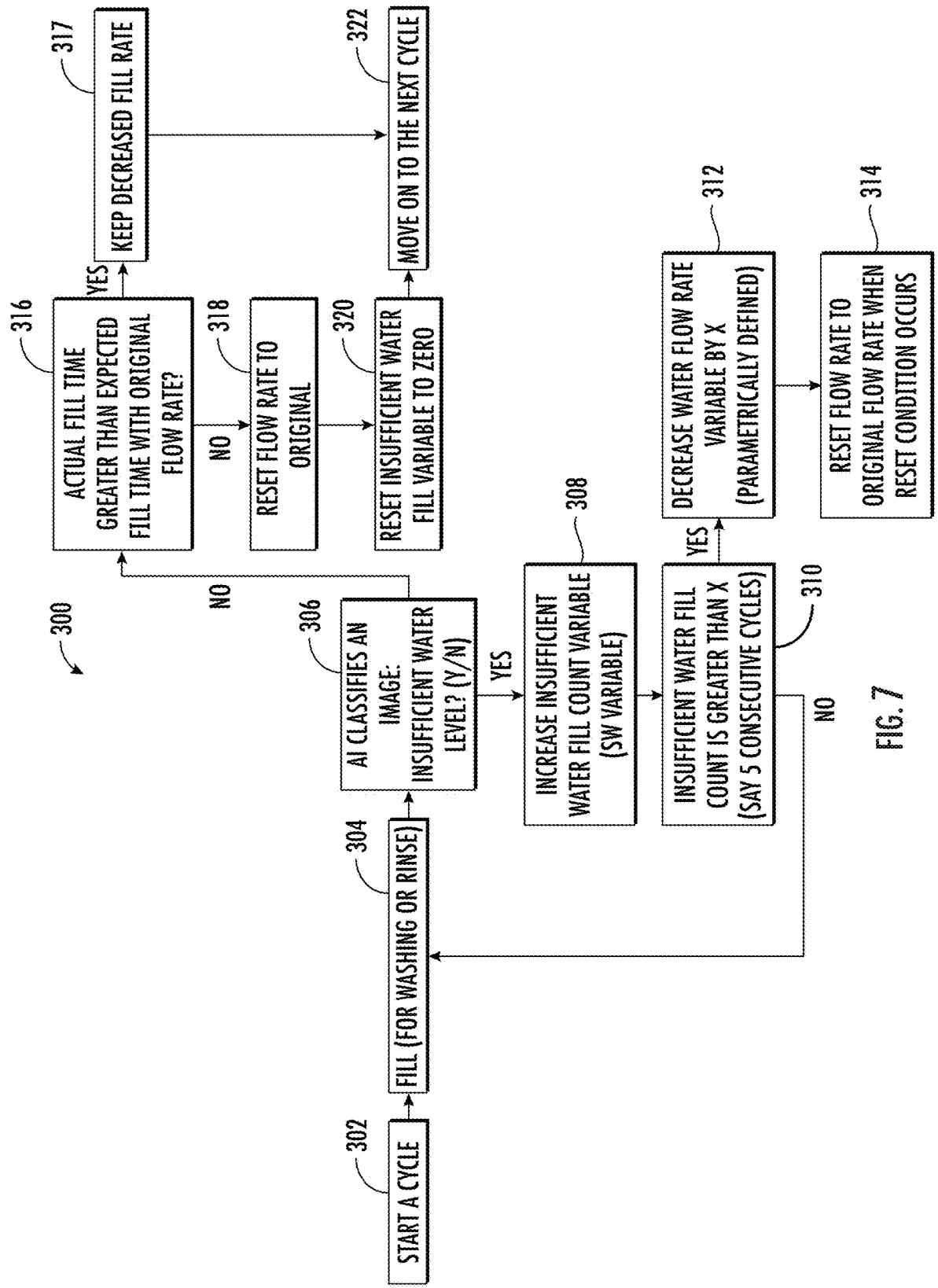
FIG. 7 provides a flow diagram of an exemplary process for implementing a water level detection method in a washing machine appliance according to an exemplary embodiment of the present subject matter.

Referring now to FIG. 7, an exemplary flow chart or operational diagram of washing machine appliance 100 performing a method 300 of the present subject matter will be described according to an exemplary embodiment. As shown, method 300 includes, at step 302, starting an operating cycle, and step 304 includes adding water during a fill cycle (e.g., to facilitate a wash or rinse cycle). Step 306 includes obtaining one or more images and analyzing/classifying those images to determine whether the water level in the wash tub is sufficient (e.g., whether the water in the wash tub has reached the predetermined water level).

In the event the water level is insufficient, step 308 includes increasing a fill count variable that tracks the consecutive number of insufficient fills. Step 310 includes determining whether the fill count variable is greater than a predetermined count threshold X. According to exemplary embodiments, this count threshold may be 5, 10, or any other suitable number of consecutive cycles where the fill process resulted in an insufficient amount of water and an increase in the fill count variable. If the count threshold is exceeded, step 312 may include adjusting a water flow rate through a water control valve in an attempt to compensate for the consistent underfills. Notably, steps 308 and 310 operate as a debounce procedure that disregards nuisance trips or situations where an underfill is not a reoccurring issue. In this manner, method 300 avoids adjusting the water flow rate at step 312 until a repetitive and substantial issue exists with the fill process.

Notably, it may be undesirable to store the adjusted water flow rate in permanent memory for future use. In this regard, certain events may occur which may be used to reset the water flow rate supplied during a fill process. For example, the water flow rate may be reset in the event of a power outage, when a new valve is installed, when washing machine appliance 100 is moved to a new location or hooked up to a new water supply, upon instruction from a user, etc. Thus, step 314 includes resetting the water flow rate to the "original flow rate" or the predetermined or manufacturer set value in the event such a reset condition occurs.

If at step 306, method 300 determines that the water level is sufficient (e.g., the water in the wash tub has reached the predetermined water level), step 316 may include measuring the amount of fill time and determining whether it took longer to fill than expected when referencing the original flow rate (e.g., before decreasing it by X at step 312). If the actual fill time is greater than the expected fill time with the original flow rate, step 317 may include keeping the decreased fill rate (e.g., decreased by X) because the flow rate is still lower than expected. By contrast, if the actual fill time is less than the expected fill time with the original flow rate, step 318 may include determining that the flow rate is normal and that there is no need to use the decreased flow rate. As a result, step 318 includes resetting the flow rate to the "original flow rate." Step 320 may include resetting the fill count variable to zero and step 322 may include moving onto the next cycle, e.g., by implementing the agitation, wash, and/or rinse procedures.

FIGS. 4 and 7 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of methods 200 and 300 are explained using washing machine appliance 100 as an example, it should be appreciated that these methods may be applied to the operation of any suitable washing machine appliance.

The systems and methods described herein provide for an intelligent fill cycle for a washer that utilizes artificial intelligence neural networks to analyze images of a wash tub to determine an amount of water within the wash tub. The washing machine may implement corrective action, e.g., by adding or draining water to reach an optimal, predetermined water level, by providing a user notification, etc. As a result, fill cycles are performed with an optimal amount of water, thereby avoiding issues with cleaning efficiency, clothes safety, detergent concentrations, agitation intensity, and overall wash performance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
   a wash tub positioned within a cabinet;
   a wash basket rotatably mounted within the wash tub and defining a wash chamber configured for receiving of a load of clothes;
   a water supply positioned within the cabinet and being configured to selectively fill the wash tub with water;
   a camera assembly mounted within the cabinet in view of the wash chamber; and
   a controller operably coupled to the camera assembly, the controller being configured to:
   perform a fill process;
   obtain one or more images of the wash chamber using the camera assembly after the fill process is complete;
   analyze the one or more images using a machine learning image recognition process to determine that the water within the wash tub has reached a predetermined water level; and
   adjust at least one operating parameter of the washing machine appliance based at least in part on determining that the water within the wash tub has reached the predetermined water level.

2. The washing machine appliance of claim 1, wherein the controller is further configured to:
   determine that the water within the wash tub has not reached the predetermined water level, and wherein adjusting the at least one operating parameter comprises adding water to the wash tub using the water supply.

3. The washing machine appliance of claim 1, wherein the controller is further configured to:
 determine that the water supply has a water pressure below a low-pressure threshold; and
 implement a responsive action in response to determining that the water pressure of the water supply is below the low-pressure threshold.

4. The washing machine appliance of claim 3, wherein implementing the responsive action comprises:
 providing a user notification when the water pressure is below the low-pressure threshold.

5. The washing machine appliance of claim 4, wherein implementing the responsive action comprises:
 adjusting a water flow rate provided by the water supply during a fill process.

6. The washing machine appliance of claim 4, wherein implementing the responsive action comprises:
 modifying a cycle time for a subsequent fill cycle.

7. The washing machine appliance of claim 1, further comprising a drain pump assembly for selectively discharging water from the wash tub, and wherein the controller is further configured to:
 determine that the water within the wash tub has exceeded the predetermined water level; and
 discharge a portion of the water using the drain pump assembly in response to determining that the water within the wash tub has exceeded the predetermined water level.

8. The washing machine appliance of claim 1, wherein the machine learning image recognition process comprises at least one of a convolution neural network ("CNN"), a region-based convolution neural network ("R-CNN"), a deep belief network ("DBN"), or a deep neural network ("DNN") image recognition process.

9. The washing machine appliance of claim 1, wherein analyzing the one or more images comprises:
 identifying a quantity or dispersion of water reflections within the load of clothes in the wash tub.

10. The washing machine appliance of claim 1, wherein the one or more images are obtained during and after a fill cycle.

11. The washing machine appliance of claim 1, wherein the one or more images are obtained before a wash agitation cycle or before a rinse agitation cycle.

12. The washing machine appliance of claim 1, wherein the camera assembly includes a light source for illuminating the wash chamber while obtaining the one or more images.

13. The washing machine appliance of claim 1, wherein the washing machine appliance is a top load washing machine appliance comprising:
 a door pivotally mounted to a top of the cabinet, wherein the camera assembly is mounted to the door and faces the wash chamber.

14. The washing machine appliance of claim 1, wherein the camera assembly is mounted to the cabinet proximate the water supply.

15. The washing machine appliance of claim 1, wherein the washing machine appliance comprises a primary supply spout, and wherein the camera assembly is mounted below the primary supply spout.

\* \* \* \* \*